United States Patent [19]

Huzino et al.

[11] Patent Number: 4,983,469
[45] Date of Patent: Jan. 8, 1991

[54] THIN FILM ELECTROLUMINESCENT ELEMENT

[75] Inventors: Seizi Huzino, Anjo; Shinya Mizuki; Masumi Arai, both of Nukata; Tadashi Hattori, Okazaki, all of Japan

[73] Assignee: Nippon Soken, Inc., Nishio, Japan

[21] Appl. No.: 312,293

[22] Filed: Feb. 17, 1989

Related U.S. Application Data

[63] Continuation of Ser. No. 118,944, Nov. 10, 1987, abandoned.

[30] Foreign Application Priority Data

Nov. 11, 1986 [JP] Japan .................. 61-268348
Mar. 3, 1987 [JP] Japan .................. 62-48027

[51] Int. Cl.⁵ ............................. H05B 33/06
[52] U.S. Cl. .................... 428/690; 313/503; 313/506; 428/691
[58] Field of Search .............. 428/690, 691, 917; 313/503, 506, 509

[56] References Cited

U.S. PATENT DOCUMENTS

| | | | |
|---|---|---|---|
| 4,634,639 | 1/1987 | Kawai | 428/691 X |
| 4,666,793 | 5/1987 | Hirate | 428/690 |
| 4,670,355 | 6/1987 | Matsudaira | 428/690 |
| 4,792,500 | 12/1988 | Kojima | 428/690 |
| 4,814,237 | 3/1989 | Nakamura et al. | 428/690 |
| 4,877,994 | 10/1989 | Fuyama et al. | 428/690 |

FOREIGN PATENT DOCUMENTS

| | | |
|---|---|---|
| 60-286128 | 12/1960 | Japan . |
| 61-122080 | 5/1961 | Japan . |
| 61-49999 | 4/1986 | Japan . |
| 62-145695 | 6/1987 | Japan . |
| 62-278790 | 6/1987 | Japan . |

Primary Examiner—James Seidleck
Attorney, Agent, or Firm—Cushman, Darby & Cushman

[57] ABSTRACT

A thin film electroluminescent element has a substrate, a transparent electrode formed on the substrate, a luminescent film wherein two kinds of luminescent centers are distributed in layers within a basic luminescent material, formed on the transparent electrode through an insulating film, and a back electrode formed on the luminescent film through another insulating film. The luminescent film of this thin film electroluminescent element can emit white light of excellent tone, including lights of three primary colors with sufficiently large luminous intensity.

10 Claims, 6 Drawing Sheets

THIN FILM ELECTROLUMINESCENT ELEMENT

This is a continuation of application Ser. No. 07/118,944, filed Nov. 10, 1987, which was abandoned upon the filing thereof.

BACKGROUND OF THE INVENTION

1. Field of the Invention

The present invention relates to a thin film luminescent element, and more particularly to an electroluminescent(EL) element emitting white light of excellent tone.

2. Description of the Prior Art

Recently, thin display panels have been developed in place of cathode-ray tube. And the EL elements, liquid crystal luminescent elements and plasma luminescent elements or the like are known as the above described display panel.

The EL elements are superior to the liquid luminescent elements in that the operable temperature range is wide and the response property is excellent. And the EL elements are also superior to the plasma elements in that the operable voltage is comparatively low, and the resistance against vibrations is excellent and a thin film can be formed because the whole element is composed of a solid body.

Under the above circumstances, there have been tried to compose a color display panel of the EL element having the above described advantages. For example, Japanese unexamined Patent publication No. Sho 61-499999 proposes an EL element having a luminescent film for emitting light of a wide wave length range and a filter film through which light of a desired wave length range out of the light emitted from the luminescent film is selectively transmitted.

In the EL element proposed by the above publication, the luminescent film is formed by adding $PrF_3$ as a luminescent center to ZnS as a basic material. The emission spectrum of the luminescent film extends over a wide wave length range from 460 nm to 800 nm. But the luminous intensity in the wave length range from 460 to 480 nm, which corresponds to that of blue out of primary colors is low and accordingly full color of uniform tone cannot be obtained.

Furthermore, Japanese unexamined patent publication No. Sho 60-286128 discloses a thin film EL element composed of a first luminescent film including no luminescent center and a second luminescent film formed on the first luminescent film and having a luminescent center with a predetermined concentration. The second luminescent film having preferable crystallinity, provides luminescence of high luminous intensity.

In addition, Japanese unexamined Patent publication No. sho 61-122080 discloses another thin film EL element of which the substrate is formed of a thermal conductive metal or ceramics.

SUMMARY OF THE INVENTION

One object of the present invention is to provide a thin film EL element provided with a luminescent film emitting white light of excellent tone, which includes red, green and blue lights as three primary colors with sufficiently large luminous intensity.

Another object of the present invention is to provide a thin film EL element enabling the color display of high contrast with a simple structure.

The thin film EL element according to the present invention is provided with a substrate, two electrode films, one of the two electrode films being formed on the substrate, a luminescent film formed between the two electrode films for emitting white light upon the application of an electric field between the two electrode films. The luminescent film is composed of a plurality of layers, each layer including a different luminescent center in a basic material, and one of the two electrode films, which is positioned at the light emitting side of the luminescent film is made of a transparent material.

In a modified embodiment of the present invention, one layer out of a plurality of layers composing the luminescent film includes no luminescent center and is interposed between other layers, each layer including a different luminescent center in a basic material.

In another modified embodiment of the present invention, each of the two electrodes is composed of a large number of parallel stripe shaped films and the two electrode films extend in such directions as to intersect each other. Portions of the luminescent film, which are positioned at intersections of the two electrode films serve as picture elements. And color filter films are formed on one of the two electrode films, which is made of the transparent material, at positions opposed to the picture elements for selectively transmitting light of a predetermined wave length range, and black films are formed between adjacent films of the color filter films.

According to the present invention, by composing the luminescent film of a plurality of layers, each including a different luminescent center in a basic material, the luminescent film can emit white light of excellent tone, including lights of three primary colors with sufficiently large luminous intensity.

According to the modified embodiment, by providing the layer including no luminescent center, the lowering in luminous efficiency due to the lowering in crystallinity of other layer can be prevented.

And according to the another modified embodiment, by providing the black films between adjacent films of the color filter films, the color display of high contrast can be obtained.

BRIEF EXPLANATION OF THE DRAWINGS

FIGS. 1 through 4 show a first embodiment of the present invention;

FIG. 1 is a partially sectioned perspective view of an EL element;

FIG. 2 is a sectional view of a main portion of the EL element;

FIG. 3 is a graph showing the concentration of the luminescent center within the luminescent film;

DETAILED DESCRIPTION OF THE EMBODIMENT

Figure 1:
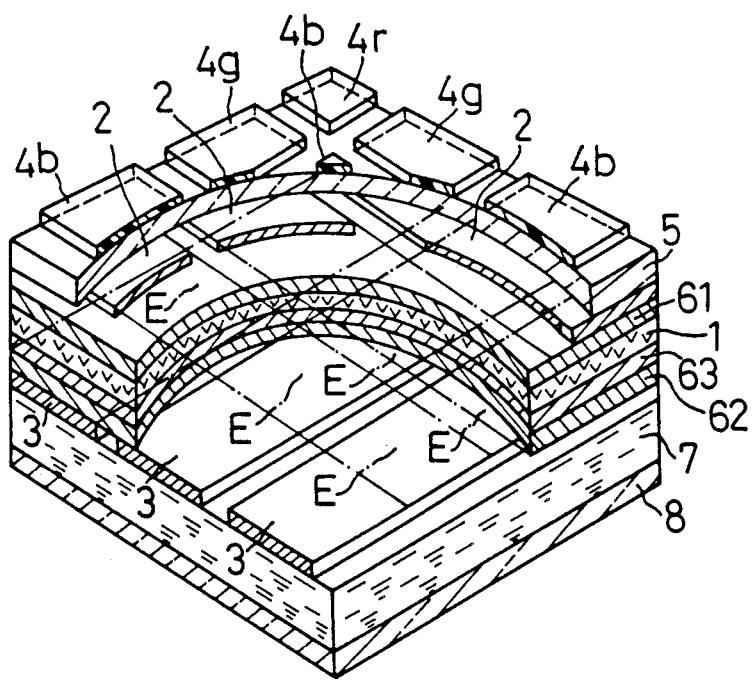

FIG. 1 illustrates a first embodiment of the present invention.

A large number of stripe-shaped parallel electrodes 2 of a constant width are formed on the under surface of a glass substrate 5. The parallel electrodes 2 are transpatent electrodes formed of $In_2O_3$ or $SnO_3$. And an insulating film 61 formed of $Ta_2O_5$, $Al_2O_3$, $Si_3N_4$, $Y_2O_3$ or like is formed on the under surface of each parallel electrode 2 by sputtering or electron beam evaporating.

A luminescent film 1 wherein at least two kinds of luminescent centers are distributed in layers within a basic luminescent material is formed on the under surface of the insulating film 61. ZnS or the like is used as the basic luminescent material.

Figure 2:
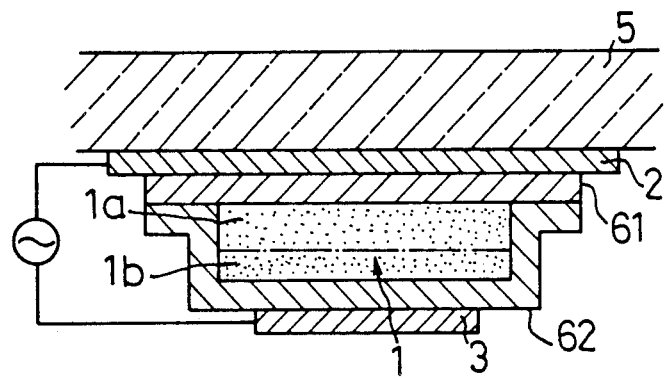
Figure 3:
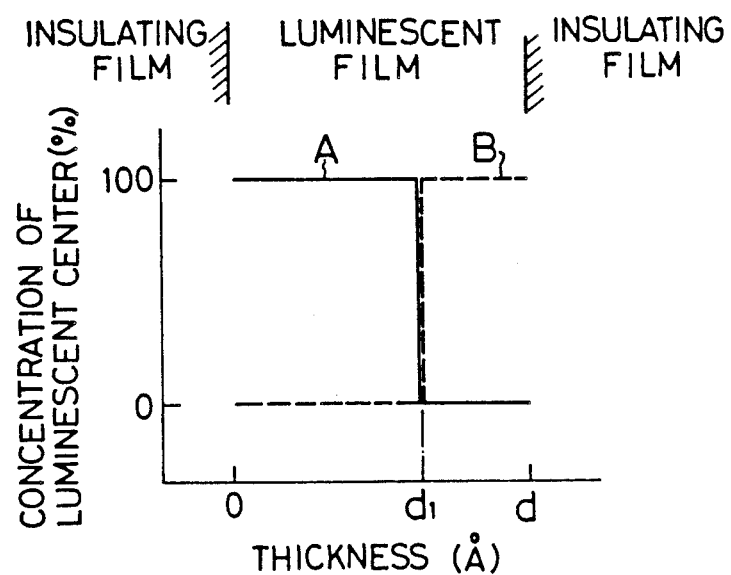

When the luminescent film 1 includes two kinds of luminescent centers as shown in FIG. 2, $TmF_3$ as a luminescent center A is distributed in a first luminescent layer $1a$ while $PrF_3$ or Mn as a luminescent center B is distributed in a second luminescent layer $1b$. The thickness of the first luminescent layer $1a$ is 0 to $d_1$, and that of the second luminescent layer $1b$ is $d_1$ to d as shown in FIG. 3. The thickness(d) of the whole luminescent film 1 is 5000Å to 1μm. And the concentration of each of the luminescent centers A and B is set so as to obtain the maximum luminance, respectively.

In addition, the luminescent film 1 can be include $TbF_3$ as the luminescent center A, and $SmF_3$ as the luminescent center B in place of the above described materials.

The first luminescent layer $1a$ and the second luminescent layer $1b$ are formed by the evaporating method, the sputtering method or the CVD method. For example, an evaporation pellet or a sputtering target, each including ZnS as the basic material and $TmF_3$ as the luminescent center, is used to form a film. And then, another evaporation pellet or another sputtering target, each including ZnS as the basic material and $PrF_3$ as the luminescent center, is used to form another film. This results in the luminescent film 1 wherein the luminescent centers $TmF_3$, $PrF_3$ are distributed in layers being formed.

When a plural sputtering device is employed, a film is formed by combining a sputtering target of ZnS including no luminescent center and another sputtering target of $TmF_3$ or $PrF_3$ with each other.

In the CVD method, a film is formed by making a gas for forming a basic material react to a gas for forming a luminescent center.

After the formation of the luminescent film 1, another insulating film 62 having the same composition as that of the insulating film 61 is formed on the under surface of the luminescent film 1 through a buffer film 63 made of $Al_2O_3$ or the like by sputtering or electron beam evaporating.

And regularly arranged stripe-shaped parallel electrodes 3 made of Al or the like are formed on the under surface of the insulating film 62 to serve as back electrodes. The transparent electrode 2 and the back electrode 3 are arranged so as to intersect each other. And portions of the luminescent film 1, which are positioned ay intersections of electrodes 2 and 3 serve as picture elements E.

Color filter films $4r$, $4g$, $4b$ are provided on the glass substrate 5 so as to be opposed to the picture elements E, respectively. An organic thin film made of gelatine, casein or the like is patterned by photolithography and the patterned film is dyed. The formed color filter films $4r$, $4g$, and $4b$ transmit red light(wave length 640 to 780 nm), green light(wave length 498 to 530 nm), blue light-(wave length 467 to 483 nm), respectively. These filter films $4r$, $4g$, $4b$ are alternately arranged on the glass substrate 5.

Silicon oil 7 is sealed by a sealing glass plate 8 under the back electrodes 3 for preventing moisture from intruding into the luminescent film 1.

Figure 4A:
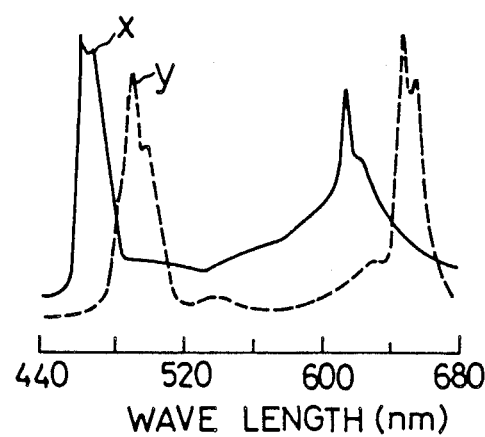
FIGS. 4A and 4B are graphs of the emission spectrum.
Figure 4B:
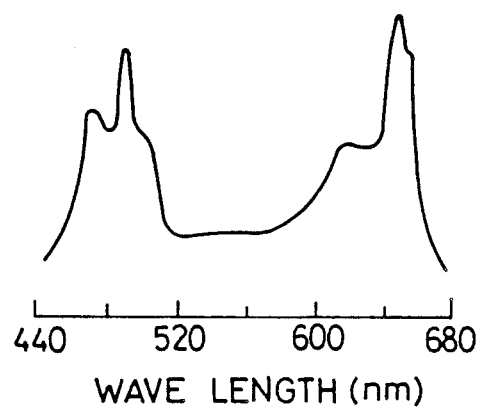

When an AC voltage is supplied between the transparent electrodes 2 and the back electrodes 3, the picture elements E positioned at the intersections of the transparent electrodes 2 and the back electrodes 3 emit white light. Namely, electrons accelerated by the AC voltage caused between the insulating films 61 and 62 excite $TmF_3$ within the first luminescent layer $1a$ and $PrF_3$ within the second luminescent layer $1b$. When the excited luminescent centers return to the respective ground state, they emit emission spectrum shown by lines x and y in FIG. 4A. As shown in FIG. 4A, the emission spectrum x includes blue right with sufficiently large luminous intensity and the emission spectrum y includes green light and red light with sufficiently large luminous intensity. Therefore, the luminescent film 1 emits light of the combination of the emission spectra x and y, which is white light of excellent tone, including lights of three primary colors with sufficiently large luminous intensity as shown in FIG. 4B. This white light passes the color filter films $4r$, $4g$, and $4b$ provided so as to be opposed to the picture elements E to be changed to luminescence colors of red, green and blue.

By selectively applying a voltage between the transparent electrodes 2 and the back electrodes 3, desired colors of the combination of three primary colors can be obtained at desired positions.

In the above described embodiment, the luminescent film is composed of two luminescent layers. Instead, the luminescent film can be composed of the other number of luminescent layers.

Figure 5:
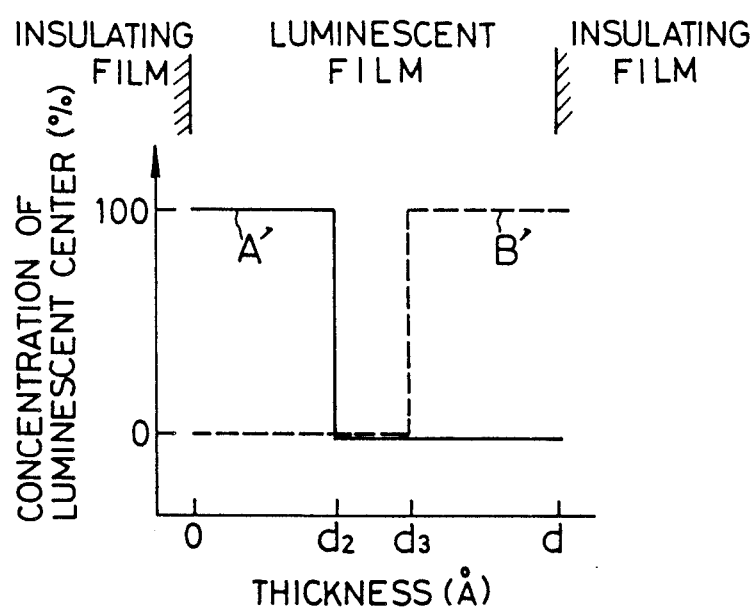
FIG. 5 is a graph showing the concentration of the luminescent center within the luminescent film of a second embodiment of the present invention.

FIG. 5 illustrates a second embodiment of the present invention. In the second embodiment, the luminescent film 1 is composed of a basic material layer including no luminescent center, which is interposed between two luminescent layers including different types of luminescent centers. In FIG. 5, a first luminescent layer includes a luminescent center of A' and has a thickness of 0 to $d_2$, the basic material layer has a thickness of $d_2$ to $d_3$ and a second luminescent layer includes a luminescent center of B' and has a thickness of $d_3$ to d.

By providing the basic material layer including no luminescent center, the lowering in luminous efficiency due to the lowering in crystallinity of the second luminescent layer can be prevented.

Figure 6:
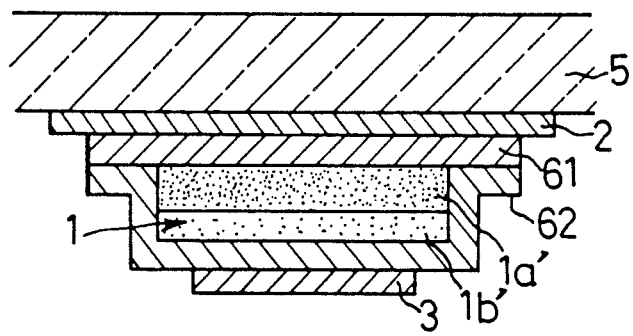
FIG. 6 is a sectional view of a main portion of the EL element of a third embodiment of the present invention.

FIG. 6 illustrates a third embodiment of the present invention. In FIG. 6, the luminescent film 1 is composed of a first luminescent layer $1a'$ including SrS as the basic material and $CeCl_3$ as the luminescent center, and a second luminescent layer $1b'$ including ZnS as the basic material and $PrF_3$ or Mn as the luminescent center. As described above, the basic material of each of the luminescent layers may be made different from each other.

Figure 7:
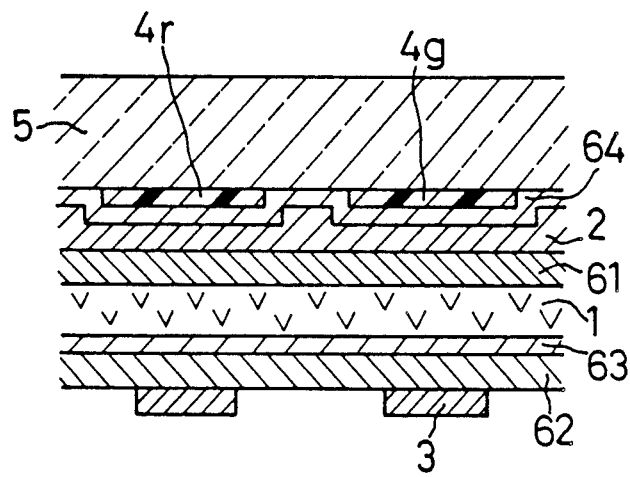
FIG. 7 is a sectional view of a main portion of the EL element of a fourth embodiment of the present invention.

FIG. 7 illustrates a fourth embodiment of the present invention. In FIG. ?, color filter films $4r$, $4g$ are formed on the under surface of the glass base plate 5. And on the under surface of the color filter films $4r$, $4g$ are sequentially formed a buffer film 64, a transparent electrode film 2, an insulating film 61, a luminescent film 1 having the same structure as that of each of the preceding embodiments, a buffer film 63, an insulating film 62 and a back electrode film 3.

The operational effect of the fourth embodiment is similar to that of each of the preceding embodiments. Furthermore, the durability and reliability of the fourth embodiment is improved since the color filter films thereof are not in direct contact with an atmosphere.

In the above described preceding embodiments, the contrast is improved by making the area of the color filter films larger than that of the picture elements since the light emitted from the picture elements gradually diverges toward the color filter films.

Furthermore, the color filter films can be formed by other methods than the above described dyeing method, such as electrodeposition method, metallizing method, printing method, and sensitizing film method.

When it is not required to reproduce full colors, the color filter films of colors other than red and green are unnecessary, for example.

Figure 8:
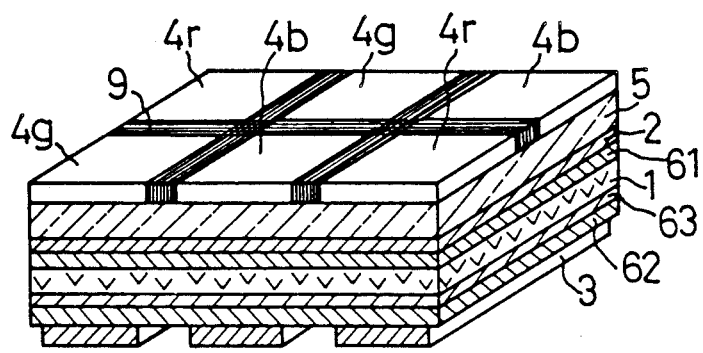
FIG. 8 is a perspective view of an overall EL element of a fifth embodiment of the present invention.

FIG. 8 illustrates a fifth embodiment of the present invention. In FIG. 8, the color filter films 4r, 4g and 4b formed on the glass substrate 5 are framed by black films 9. The black films 9 are formed by coloring organic thin films with black.

According to the fifth embodiment, light can be prevented from leaking out from the interface between the color filter films 4r, 4g, 4b. This results in the contrast being much improved.

Figure 9:
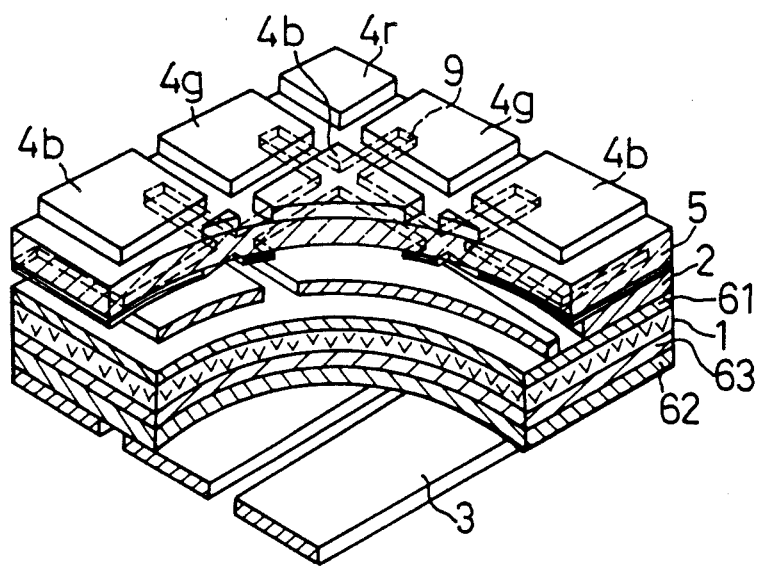
FIG. 9 is a partially sectioned perspective view of the EL element of a sixth embodiment of the present invention.

The black films 9 may be formed on the under surface of the glass substrate 5 as shown in FIG. 9. A film of PbTe, PbSe, HgTe, HgSe or the like is formed on the under surface of the glass substrate 5 by sputtering and evaporating, and then checkered pattern is formed by photolithography. Thus, the black films 9 absorbable all visible lights, are formed. The black films 9 are positioned so as to be opposed to the gaps between the color filter films 4r, 4g, and 4b. This structure also has an operational effect similar to that of the fifth embodiment.

The present invention is not limited to the above described thin film EL elements having insulating films on the upper and under surfaces of the luminescent film.

The present invention can be applied to a thin film EL element having so called MIS structure, namely, that an insulating film is formed on only one side of the luminescent film.

Furthermore, the EL element according to the present invention can provide white area luminescence of excellent tone so as to be preferably used as a back illumination of a liquid crystal display(LCD).

What is claimed is:
1. A thin film electroluminescent element comprising:
a substrate;
two electrode films, one of said two electrode films being a transparent electrode film formed on a first surface of said substrate and being made of a transparent material; and
a luminescent film formed between said two electrode films for emitting white light through said transparent electrode film upon the application of an electric field between said two electrode films, said luminescent film including three contiguous layers, one layer being formed of a basic material having no luminescent center that is interposed between the other two luminescent layers formed of said basic material and having different luminescent centers.

2. A thin film electroluminescent element according to claim 1, wherein said basic material is ZnS, one of said two luminescent layers includes $TmF_3$ as one luminescent center and the other one of said two luminescent layers includes $PrF_3$ as another luminescent center.

3. A thin film electroluminescent element according to claim 1, wherein said basic material is ZnS, one of said two luminescent layers includes $TmF_3$ as one luminescent center and the other one of said two luminescent layers includes Mn as another luminescent center.

4. A thin film electroluminescent element according to claim 2, wherein said basic material is ZnS, one of said two luminescent layers includes $TbF_3$ as one luminescent center and the other one of said two luminescent layers includes $SmF_3$ as another luminescent center.

5. A thin film electroluminescent element according to claim 1, wherein each of said two electrode films is composed of a large number of parallel stripe shaped films, said two electrode films extending in such directions as to intersect with each other, portions of said luminescent film positioned at intersections of said two electrode films serving as picture elements, and further comprising color filter films formed on a second surface of said substrate opposite to said first surface on which said transparent electrode film is formed, said color filter films being made of a transparent material, as positions opposed to said picture elements for selectively transmitting light of a predetermined wavelength range.

6. A thin film electroluminescent film according to claim 5, wherein each of said color filter films selectively transmits light of a wavelength different from each other, which are alternately formed on said one of said two electrode films.

7. A thin film electroluminescent element according to claim 6, wherein said color filter films are composed of three types of filter films, each selectively transmitting one of red light, green light and blue light.

8. A thin film electroluminescent element according to claim 5, further comprising: black films formed between adjacent films of said color filter films.

9. A thin film electroluminescent element according to claim 8, wherein said black films are formed by coloring organic films black.

10. A thin film electroluminescent element according to claim 8, wherein said black films are made of one of PbTe, PbSe, HgTe, and HgSe.

* * * * *